ated June 21, 1966

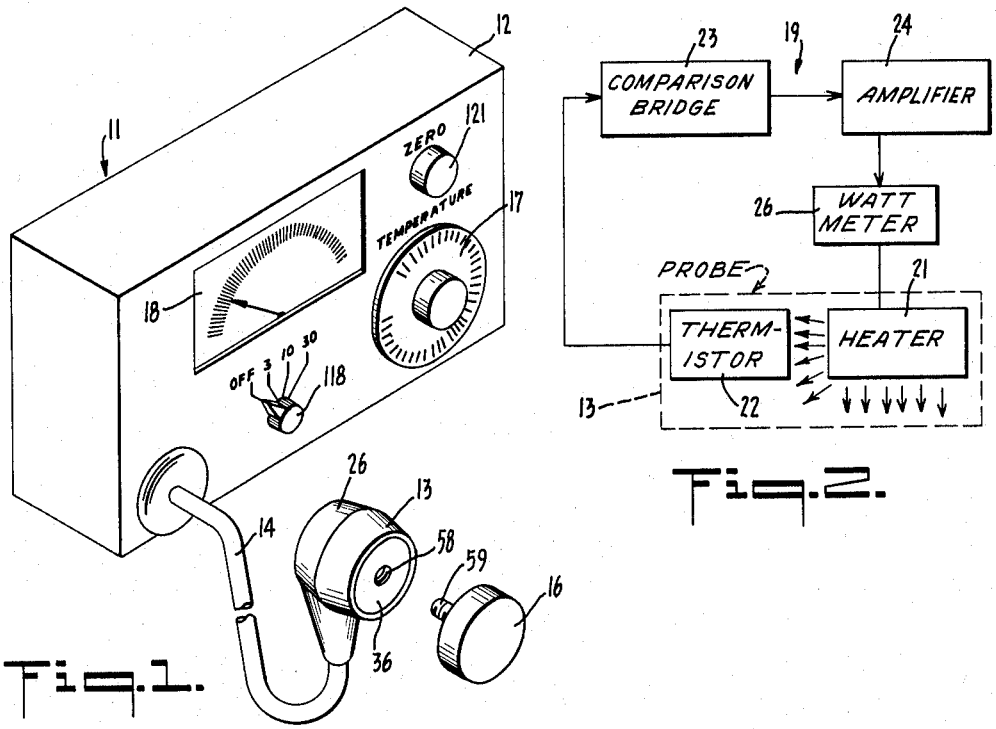
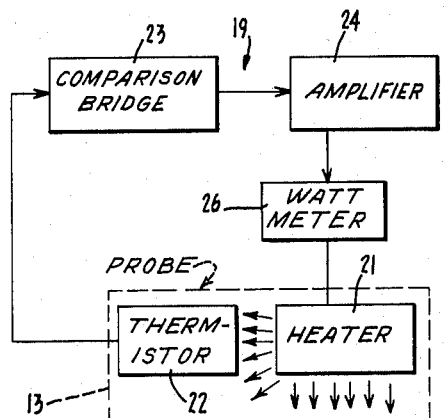
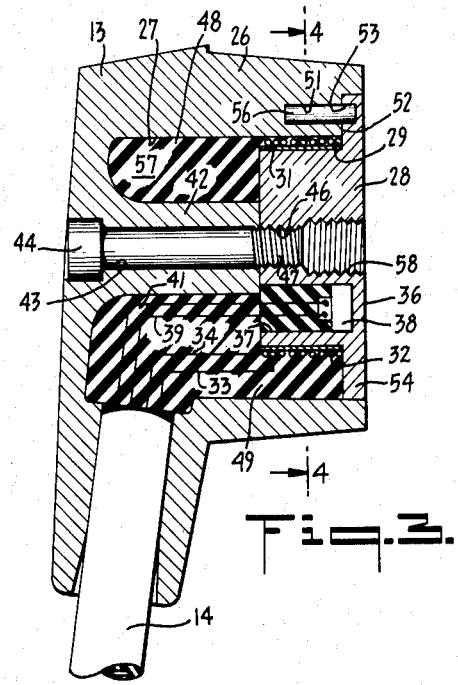
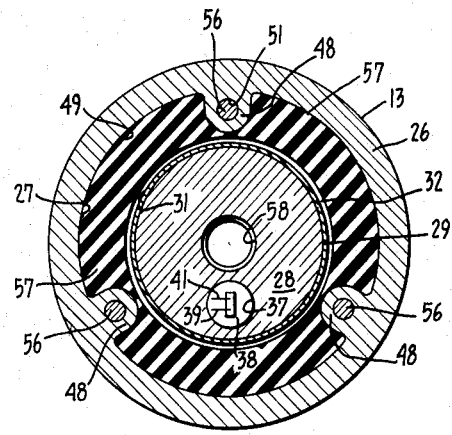

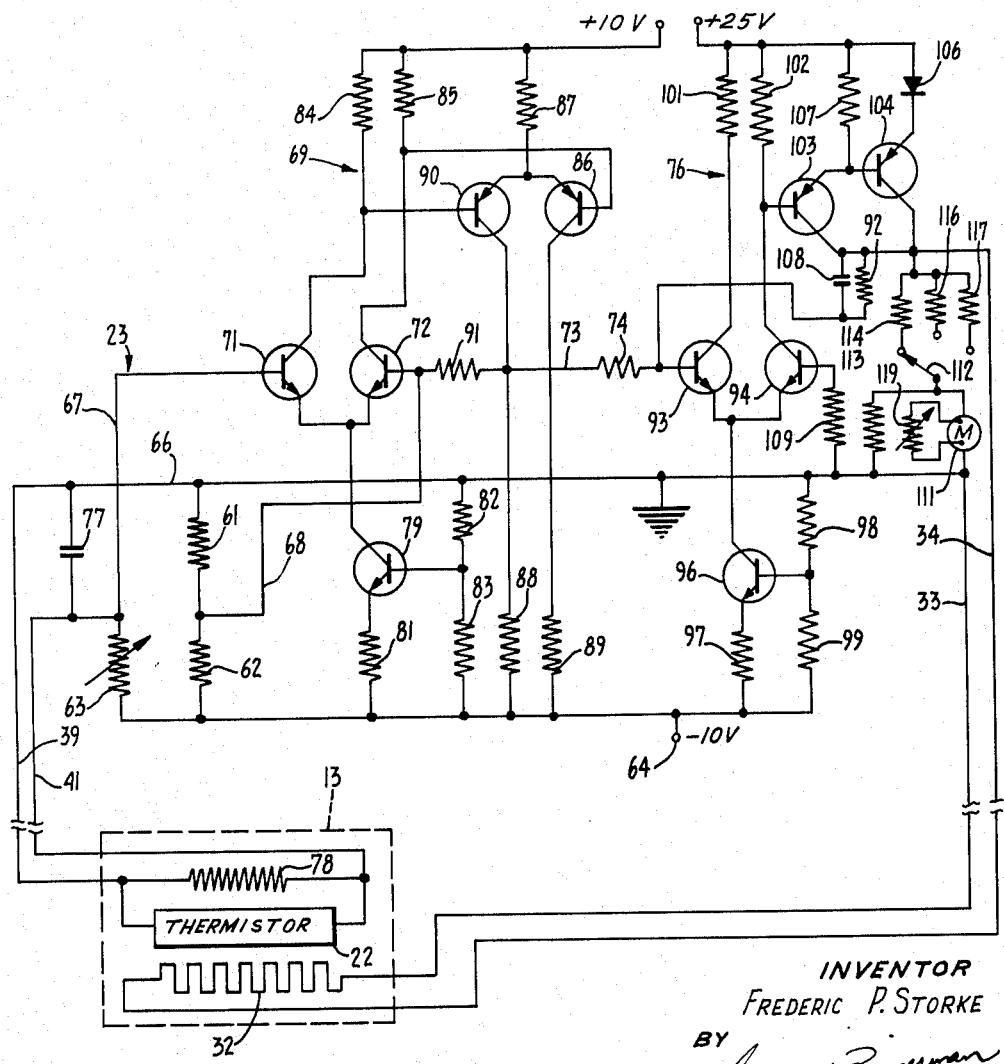

3,256,734
HEAT TRANSFER MEASURING APPARATUS
Frederic P. Storke, Jr., Palo Alto, Calif., assignor to
I.E.R.C., Burbank, Calif., a corporation of California
Filed Sept. 16, 1963, Ser. No. 309,022
10 Claims. (Cl. 73—193)

This invention relates generally to means for making heat transfer measurements, and more particularly to an apparatus for measuring the rate of heat flow into a heat sink at a selected predetermined temperature.

In evaluating the heat transfer characteristics of various types of heat sinks, for example electronic components such as transistors, it frequently is required to determine the ability of the sink to dissipate heat at a given temperature. Heretofore, determinations of this type have been possible only by tedious and time consuming approximation techniques. For example, it can be initially approximated what quantity of heat flow is necessary to raise the heat sink to a selected temperature, after which such heat flow is applied and the actual temperature to which the heat sink is brought is observed and recorded. A second approximation of heat flow is then made with the new value of temperature again being observed for this heat flow. A curve can be plotted from this data so that the quantity of power dissipation for the particular heat sink at a selected temperature can be obtained from the curve. The foregoing conventional technique is highly time consuming because of the relatively long time constants involved in making a single measurement. That is, when the approximated heat flow is applied to the sink the temperature measurement cannot be made until the system has substantially reached steady state condition. As an example of the time involved in such a measurement, a heat sink having a thermal resistance of 2.2° C./W and a thermal mass (140 grams) of 120 joules/° C. has a time constant of approximately 300 seconds. Since it usually takes at least 4 time constants to reach steady state, a measurement of one point on the curve will take about 20 minutes. In general, most commedcial heat sinks vary in time constants from about 3 to 10 minutes, so that the time involved in making these measurements usually ranges from about 12 to 40 minutes per measurement. The total time for each determination is accordingly longer, depending on the number of measurements that must be made to obtain the desired curve.

The apparatus of the present invention improves significantly over the foregoing conventional technique since in a matter of seconds the apparatus provides a single reading which indicates the ability of a heat sink to dissipate heat at any predetermined temperature. Basically, the present apparatus comprises a servomechanism arrangement including a probe that can be placed up against the heat sink and supply heat to the sink for dissipation. The electrical circuit control means of the apparatus initially provides an excess amount of power to the probe, in order to minimize the amount of time required for the probe to reach a predetermined temperature level; but as that temperature level is reached the apparatus then provides just the requisite amount of power to the probe in order to maintain the temperature at the selected predetermined value.

Accordingly, an object of the present invention is to provide apparatus for quickly and easily measuring the heat dissipation characteristics of various types of heat sinks at various selected predetermined temperatures.

Another object of the invention is to provide apparatus of the character described which in addition to measuring power dissipation at given temperatures can be used to measure thermal mass, thermal resistance, and serve as a source of constant temperature.

A further object of the invention is to provide apparatus of the character described which is relatively inexpensive to manufacture, yet which includes electronic circuitry that is highly stable and reliable.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a perspective view depicting the heat transfer apparatus of the present invention;

FIGURE 2 is a block diagram depicting a basic apparatus embodying the present invention;

FIGURE 3 is a cross sectional elevation view through the axis of the probe shown in FIGURE 1;

FIGURE 4 is a cross sectional view along the plane of line 4—4 as shown in FIGURE 3; and FIGURE 5 is an electronic circuit diagram of an apparatus embodying the present invention.

Referring now to said drawings, there is shown in FIGURE 1 heat transfer measuring apparatus 11 including a main housing 12 and a probe 13 connected to the housing by a flexible cord 14 and adapted to provide a flow of heat to a heat sink 16. A dial 17 on the base of the housing enables a predetermined probe temperature to be selected, whereupon sufficient power is supplied to the probe to maintain it at that temperature. A meter 18 mounted on the housing 12 indicates the power being dissipated by the probe.

The electronic circuitry of the invention is depicted broadly in FIGURE 2 in the form of a block diagram, and is seen to comprise a closed loop circuit 19 of which the probe 13 forms a part. As shown, the probe includes a heater 21 for providing a flow of heat from the probe and temperature sensitive means such as a thermistor 22 for indicating the temperature at the probe. The thermistor is electrically coupled to a control circuit such as one including a comparison bridge 23 whereby the temperature at the probe can be compared to a selected predetermined temperature at which the probe is to operate. An electric signal produced by the circuit 19 indicating the error or difference between the probe temperature and the predetermined temperature is coupled to a source of electrical power such as an amplifier 24, with the power output of the amplifier 24 being controlled by the signal from the bridge 23. The output of the amplifier 24 is electrically connected to the heater 21 to control the heat flow produced thereby, and indicating means such as a watt-meter 26 is coupled to the amplifier output for use to measure the amount of power being supplied to and dissipated by the probe. As will be described, the bridge 23 is provided with means for selectively choosing the predetermined temperature at which the probe is to operate. With this temperature being selected, the closed loop 19 operates in the manner of a feedback system in which the temperature sensed by the thermistor controls the power supplied by the amplifier, with the power thus supplied controlling the heat produced at the probe, which in turn controls the temperature sensed by the thermistor.

Regarding now the preferred structure of the probe 13, reference is made to FIGURES 3 and 4 wherein the probe is depicted as including a probe casing 26 having a hollowed out chamber 27 therein, with heat conductive means such as hot plate 28 being mounted on the casing in the chamber thereof. As shown, the hot plate 28 is of generally cylindrical shape and has a layer of sintered glass 29 provided on its side walls 31. Means for converting electrical energy into heat is provided adjacent the hot plate 28, and preferably includes a resistive heating coil 32 wound around the hot plate overlying the glass layer 29. Electrical leads 33, 34 are coupled to the coil 32, and extend out of the casing 26 into the cord 14 to be connected to a source of electrical power as is subsequently described. Since the glass layer 29 is a good conductor of heat, in addition to being electrically insulative, heat produced by the coil 32 is conducted directly into the hot plate 28 for dissipation at the exposed face 36 thereof.

A closed bore 37 is provided in the hot plate 28 and has its flat closed end positioned closely adjacent the face 36 of the hot plate. A thermistor 38 disposed in the bore 37 is thus adapted to sense the probe temperature substantially at the conducting face 36. Electrical leads 39, 41 are connected to the thermistor 38 and form a part of the cord 14 leading to the control circuit contained in the housing 12.

Concerning some of the details of construction of the probe 13, a boss member 42 extends inwardly in the chamber 27 and has a bore 43 adapted to receive a screw 44. An upper threaded bore 46 in the hot plate 28 is engaged by the threaded end 47 of the screw 44, thus axially holding the hot plate on the casing. Ribs 48 extend along the inner wall 49 of the chamber 27, and have bores 51 in the end shoulders 52 of the ribs which register with bores 53 in a bottom flanged portion 54 of the hot plate 28. The flange portion 54 abuts against the ends 52 of the ribs 48, with stud members 56 being disposed in the opposed bores 51 and 53 to restrict the hot plate against rotational movement. Suitable insulation 57, such as a foam material or the like, fills in the chamber 27 around the coil 32 and above the hot plate flange portion 54, thus minimizing flow of heat from the probe other than at the exposed face 36.

As shown in the drawings, a threaded bore 58 is provided in the face 36 to enable the heat sink 16 to be placed in secure contact with the face 36 by means of its threaded stud 59. This bore has been found generally suitable for mounting various sizes and shapes of heat sinks, and for most purposes any losses from portions of the face 36 not covered by the sink have been found insignificant. It will be appreciated, however, that the configuration of the hotplate can be made other than cylindrical, and more than one bore can be provided on the face 36 where desired. For example, if exacting measurements are sought to be taken with regard to a transistor having a diamond shaped base as a heat sink, a probe can be used that has a diamond shaped face 36 with two threaded bores at opposite corners of the diamond to accommodate the conventional screw holes in the transistor. Separate screws extending through the transistor holes into the bores on the probe face would then mount the transistor securely on the probe, with substantially the entire probe face being covered by the surface of the transistor.

Reference is now made to FIGURE 5 wherein is shown the electronic circuit incorporating the detailed elements used in the feedback loop 19 previously described with regard to FIGURE 2. In particular, the bridge circuit 23 preferably includes four resistance legs, three of which are depicted by the resistors 61, 62 and 63 and the fourth of which consists of the thermistor 22. The resistors 61 and 62 form one voltage divider branch of the bridge and are serially connected between a −10 volt supply 64 and a ground wire 66. The other branch of the bridge is formed of the thermistor 22 and the resistor 63, which are also coupled between the −10 volt supply and ground in parallel with the resistors 61 and 62. A pair of leads 67, 68 couple the bridge to a differential voltage amplifier stage 69, which centers about a pair of transistors 71, 72. As is apparent, the lead 67 couples between the adjacent ends of the thermistor 22 and resistor 63 to one input of the amplifier 69 which is at the base of the transistor 71. The other lead 68 connects from the adjacent ends of the resistors 61 and 62 to the base of the transistor 72, forming the other input of the differential amplifier.

The output signal from the amplifier stage 69 is taken at the lead 73 and couples through a resistor 74 into a power amplification stage 76 to be described.

With more detail now regarding the bridge 23, it will be appreciated that the fixed voltage divider of the fixed resistors 61, 62 feeds a set input to the transistor 72. The thermistor 22 and resistor 63 also form a voltage divider, with the signal at the lead 67 being determined by the value of the resistances in the thermistor and resistor 63. When the signals on the leads 67, 68 are exactly equal, no output signal appears at the lead 73. Conversely, when the bridge is out of balance and different signals are fed to the two inputs of the amplifier stage 69, an output signal appears which is proportional to the error difference in the two input signals. Thus it will be appreciated that the magnitude of the differential input to the stage 69 depends on the resistance value of the thermistor 22, which of course depends on the temperature at the probe. A capacitor 77 is provided in parallel with the thermistor 22, across the ends of leads 39, 41 adjacent the housing 12 in order to block out any stray pickup by the cable 14.

The thermistor 22 preferably used in the probe is of the sintered disc type, and over its temperature range has a nonlinear resistance characteristic. While the scales of the instant apparatus could of course be calibrated to account for this nonlinearity, it is preferable that the bridge produce a linear output directly proportional to changes in temperature. Accordingly, it has been found that by providing a resistor 78 of the proper value in parallel with the thermistor that the combined resistance of the parallel branches will be linearly proportional to temperature changes over a suitably wide temperature range. In particular, if the resistor 78 has a value equal to 0.3 times the resistance of the thermistor at 25° C. the combined resistance varies linearly over the temperature range 30°–80° C. As an example, a thermistor having a resistance of 4K at 25° C. was placed in parallel with a 1.2K resistor and observed to have the foregoing characteristic. The resistor 78 can be mounted in the probe 13 as suggested in FIGURE 5, to enable proper matching of the resistor and thermistor in manufacturing the probe separately from the rest of the circuit, or can be mounted in the housing 12 as is desired. With the thermistor thus adapted to provide linear resistance changes, the output of the stage 69 also varies linearly with temperature changes.

In order that the probe be adapted to operate at any of a range of temperatures, the resistor 63 preferably is formed as a variable resistance as shown, and is operated by the temperature control knob 17 depicted in FIGURE 1. It is apparent that for different values of the resistances 63, it takes a different resistive value of the thermistor to put the bridge in balance. Consequently, adjusting the knob 17 enables the predetermined temperature of the probe to be selected in a simple and easy manner.

As respects the circuit details of the differential amplifier stage 69, a transistor 79 is coupled as shown between the bases of the transistors 71, 72 through a resistor 81 to the −10 volt supply thus providing a constant current source for operating the transistors 71, 72. Two resistors 82, 83 coupled serially between ground and the −10 volt supply provide proper biasing for the transistor 79, with the latter's base being connected intermediate the resistors 82, 83. Resistors 84, 85 couple a +10 volt supply to the collectors of the transistors 71, 72. A second pair of transistors 90, 86 have their bases respectively connected to the collectors of the transistors 71 and 72, and are supplied at their emitters from the +10 volt supply by a common resistor 87. The collectors of the transistors 90, 86 are respectively coupled to the −10 volt supply through resistors 88, 89. The two transistors 90, 86 provide amplification of the differential error signal appearing at the collectors of the transistors 71, 72, and the output lead 73 is connected to the collector of the transistor 90. A resistor 91 is connected between the output lead and the base of the transistor 72 to provide feedback which aids in stabilizing the amplifier stage 69 from variations or fluctuations in the transistor characteristics.

Considering next the power amplifier stage 76, this stage takes the signal from the stage 69 and amplifies it to provide a source of power to be fed to the heating coil 32 in the probe. The power amplifier is of conventional design and basically consists of a high gain operational amplifier with feed back determined by the input resistance 74 and an output resistance 92 such that the overall gain of the power stage 76 is substantially equal to the value of the resistor 92 divided by the value of the resistor 74. In more detail now, the stage 76 includes a pair of transistors 93, 94 having their emitters coupled to a constant current source provided by a transistor 96 which has its emitter connected through a resistor 97 to the −10 volt supply. A pair of resistors 98, 99 connected between ground and the negative supply serve to provide proper bias at the base of the transistor 96. A pair of resistors 101, 102 are respectively connected to the collectors of the transistors 93, 94 to couple these transistors to the +25 volt supply. The output of the differential pair of transistors 93, 94 is connected single ended from the collector of the transistor 94 to the base of a transistor 103 forming a part of a "Darlington" compound pair also including a transistor 104 having its base coupled to the emitter of the transistor 103.

A diode 106 provides proper biasing of the emitter of the transistor 104, the base of which is coupled through a resistor 107 to the +25 volt supply. Output from the stage 76 is taken at the collectors of the pair of transistors 103, 104, which are tied together, with the resistor 92 providing feed back to the input as described above. The leads 33, 34 from the heater coil 32 couple respectively to ground and the output of the stage 76, with a capacitor 108 being paralleled over the resistor 92 to block out stray pickup from interfering with the feedback. A resistor 109 couples the base of the transistor 94 to ground.

In order to measure the power being dissipated at the probe, a meter 111 is coupled between the amplifier 76 output and ground. To accommodate different ranges of operation, a range switch 112 is coupled in series with a fixed resistor 113 and selectively with one of the three resistors 114, 116 and 117, whereby the resistor 113 and each of the other three resistors forms a different voltage divider. The meter 111 is hooked in parallel with the resistor 113, with the voltage sensed by the meter depending on which of the three resistors 114, 116, 117 is selected by the range switch 112. The meter is of a suitable type adapted to read linearly in power, in response to the voltage across the resistor 113, and is properly calibrated to indicate the actual power at the output of the stage 76. The knob 118 shown in FIGURE 1 controls operation of the range switch 112, and also can be hooked up to turn the apparatus on and off.

In various instances it may be desirable to adjust the reading on the scale 18 to account for variations in operating conditions. Accordingly, a variable resistance 119 is suitably coupled into the meter 111, and is operated by the zero knob 121 on the housing shown in FIGURE 1.

In operating the apparatus of the present invention described above to measure the ability of a heat sink to dissipate heat, the first step is to move the knob 17 to select the predetermined temperature at which heat is to be dissipated. This step correspondingly sets the variable resistor 63 so that the bridge is in balance when the temperature sensed by the thermistor is of the magnitude selected. The next step is to zero in the meter 18, and this is accomplished by placing a piece of heat insulative material over the face 36 of the probe, whereby the probe will theoretically dissipate no heat. The switch 118 then is operated to turn on the apparatus, the lowest power range being selected, and a few moments are allowed while the probe is brought to steady state at the desired temperature. While theoretically under these circumstances there should be no heat dissipation in the system, there of course will be a small amount of losses, as for example through the screw 44, boss 42, and leads 33, 34 from the coil 32. Consequently, the zero knob 121 can be operated to give a zero reading thus biasing the system to account for the losses.

With the zero and temperature knobs thus adjusted, the insulating material is removed from the base 36 and the heat sink to be tested is placed in contact therewith. The range switch may have to be adjusted depending on the power dissipation as observed. In a quick time the probe will again be brought to the desired temperature, and the meter 18 can be read to determine the power being dissipated by the sink.

To describe the foregoing operation with reference to the circuit as shown in FIGURE 5, it will be appreciated that when the sink is first contacted by the probe and the power turned on there is a very large error signal formed at the bridge, and correspondingly applied to the power amplifier input. Consequently, the power amplifier will operate at substantially its full output capability, thus raising the temperature of the probe very quickly. When the desired temperature is reached the bridge will be approximately in balance, whereby the power output of the power amplifier comes down to steady state operation. The circuit parameters are selected such that when the probe is at the desired temperature, there is created at the bridge a small error signal of proper magnitude to cause the power amplifier to supply power to the probe in the amount of the heat being dissipated, thus providing steady state operation. If the heat dissipation is to be measured at a different temperature, the knob 17 is positioned as desired, and the meter 18 will directly give the power dissipation at the new temperature.

As an example of a set of circuit parameters used in the circuit shown in FIGURE 5, the following values are given:

| | |
|---|---|
| R (Thermistor)–22 | 4.0K at 25° C. (Fenwall JA34W1). |
| R–78 | 1.2K. |
| R–63 | 3–8K pot. |
| R–61 | 1.8K. |
| R–62 | 12.0K. |
| R–81 | 4.7K. |
| R–83 | 4.7K. |
| R–88 | 2.2K. |
| R–89 | 2.2K. |
| R–82 | 4.7K. |
| R–91 | 150K. |
| R–84 | 2.2K. |
| R–86 | 2.2K. |
| R–87 | 220 ohms. |
| T–71, 72 | 2N1302. |
| T–86, 90 | 2N1303. |
| R–74 | 3.3K. |
| R–92 | 15K. |
| R–97 | 2.2K. |
| R–98 | 4.7K. |
| R–99 | 4.7K. |
| R–101 | 1.0K. |
| R–102 | 1.0K. |
| R–107 | 200 ohms. |
| R–109 | 1.0K. |
| D–106 | SLA–22. |
| T–93, 94, 96 | 2N1302. |
| T–103 | 2N404A. |
| T–104 | 2N1545. |
| R–113 | 2.5K. |
| R–114 | 945 ohms. |
| R–116 | 3.625K. |
| R–117 | 8.4K. |

The resistor 114, 116, and 117 provide power ranges on the meter 18 respectively up to maximums of 3, 10, and 30 watts, as shown adjacent the knob 118 in FIGURE 1.

It will be appreciated that the feedback resistor 92 is shown connected directly at the collectors of the transistors 103, 104, consequently, because of line drop in the leads 33, 34, the "power output" being sampled and fed back by the resistor 92 is not the power actually being received by the resistive heater coil. When a cord 14 of only a few feet long this difference has been found insignificant. With longer lines, however, and in the interest of highest accuracy, it frequently is desirable to have the resistor 92 connected to a fifth lead in the cord 14 (not shown) which ties to the lead 34 immediately adjacent the coil 32 in the probe, as opposed to being connected as shown in FIGURE 5. Similarly, a sixth lead would be used to connect the resistor 109 to the lead 33 immediately adjacent the coil in the probe, as opposed to being connected directly to ground as shown, thus accounting for line loss in the feedback function of the transistor 94. Because of the large amount of current to be conducted to the probe, it is noted that a spearate ground lead 39 is connected to the thermistor in addition to the heating coil ground lead 33, thus assuring against interference with the highly sensitive function of the comparison bridge circuit.

As has been previously explained, the power amplifier responds to the electrical error signal developed by the bridge circuit. When the temperature selected by the setting of dial 17 (resistor 63) is less than the actual temperature of the probe (thermistor 38 including active element 22), the bridge circuit develops an error signal of one polarity, which may be taken as being negative where it appears on the base of transistor 71. The power amplifier then produces zero, or substantially zero, output power. This situation occurs, for example, when a heat sink has been tested at a temperature of 50° C. and a stable operating condition reached and a power consumption determined, and it is then desired to test the same heat sink at a lower temperature such as 40° C. While the temperature of the heat sink is falling to its new level the power amplifier develops no power output.

On the other hand, during a heat transfer measurement when a condition of stability has been reached, the actual temperature of the probe will be slightly below the selected temperature as established by the dial 17. With circuit constants as indicated this difference is generally a small fraction of 1°. The electrical error signal developed by the bridge circuit is now of the other polarity, which may be taken as positive where it appears at the base of transistor 71.

While the instrument is designed to operate over a range of temperatures typically from 25° C. to 80° C., it will none the less be appreciated that an error signal corresponding to less than 1° of temperature difference between the probe (thermistor 22) and the dial setting (resistor 63) is sufficient to develop the maximum output power of the power amplifier. In other words, the power amplifier is adapted to produce its maximum output power in response to an electrical error signal of the positive polarity whose magnitude is very small compared to the predetermined range of values of selected temperature throughout which the instrument is designed to operate. If the power dissipating capacity of the heat sink is tested at one temperature level, such as 50° C., and the instrument is then set for a higher temperature level such as 60° C. to test the dissipating capacity of the heat sink at that temperature level, the electrical error signal then developed by the bridge circuit is so large that the power amplifier is immediately over-driven and develops its maximum output power. The heavy rush of power supplied to the probe, and through it to the heat sink being tested, causes the temperature of the heat sink and probe to rapidly rise to the new level established for purposes of the test. Thus, the lengthy and expensive waiting time involved in using prior types of equipment is eliminated. Of course, as previously described, when the heat sink reaches the new temperature level of 60° C. the amplifier then delivers only the amount of power necessary to maintain a stable temperature level.

In addition to making measurements of power dissipation at selected temperatures, the instant apparatus can serve various other functions, as for example providing a source of constant temperature. Also, the apparatus can be used in making measurements of thermal resistance. For example, an elongated rod can be positioned with one end on the face 36 of the probe, with its side walls being insulated. The other end of the rod is placed up against a constant temperature source at a lower temperature than the probe. The thermal resistance can then simply be calculated by the formula $$R_t = \frac{T2 - T1}{P}$$

where P is the heat power flowing through the rod as indicated by the reading on the meter 18. It is useful for this measurement to make a zero adjustment to account for heat flow not going into the rod. Measurements can be made of the thermal mass of a sink, by placing the probe against the sink and observing the time interval it takes to read the selected temperature. Since the thermal mass of a body is a function the amount of heat needed to rise the temperature a given increment, it is necessary to approximate the flow rate of heat loss while the apparatus is raising the mass to the selected temperature. With the actual input flow rate thus corrected, integrating the flow input over the time interval it takes to reach the selected temperature gives the quantity of heat taken in by the mass in being raised to that temperature.

For the foregoing it is apparent that the present invention has provided significantly improved means for making various measurements of thermal characteristics, including heat dissipation capacity, thermal resistance, and thermal mass.

What is claimed is:
1. Heat transfer measuring apparatus comprising:
   probe means for supplying a flow of heat to a heat sink;
   means for supplying power to said probe means;
   manually controlled means for producing a reference signal representing a selected predetermined temperature;
   means to sense the temperature of the probe in order to provide a basis for a useful error signal;
   comparison means for combining the two signals for producing the error signal;
   control means responsive to the error signal and coupled to said power supply means for causing sufficient power to be supplied to said probe to maintain said probe at substantially the selected predetermined temperature;
   and means for indicating the quantity of heat power dissipated by said probe;
   said control means including an amplifier responsive to a relatively small value of the error signal for developing its maxmium output power whereby in testing the heat sink at successively higher predetermined temperature levels the waiting time between test points is substantially eliminated.

2. Apparatus as claimed in claim 1 wherein said temperature sensing means includes a thermistor, said manually controlled means includes a variable resistor, said comparison means includes elements of a bridge circuit, and wherein said thermistor, said variable resistor, and said elements are coupled together to form a complete bridge circuit.

3. Heat transfer measuring apparatus for measuring the rate of heat flow into a heat sink at a selected predetermined temperature comprising, in combination:

a heat conductive hot plate having a face for dissipating heat;

an electrical resistive heater positioned adjacent said hot plate and adapted to convert electrical power into heat which is conducted into said hot plate and dissipated at said face thereof;

a temperature sensitive device positioned adjacent said hot plate for sensing the approximate temperature thereat;

an electrical power amplifier having its output coupled to said heater for supplying power thereto;

manually operable selection means for establishing a selected operating temperature of said hot plate within a predetermined temperature range;

electrical circuit means coupled to said temperature sensitive device and to said selection means and responsive thereto for producing an electrical error signal whose polarity and magnitude correspond to the difference between the selected and actual temperatures of said hot plate, said electrical circuit means being also coupled to the input of said amplifier for applying said electrical error signal thereto;

said amplifier being responsive to one polarity of said error signal when said selected temperature is less than the actual temperature of said hot plate for producing substantially no output power, and being responsive to the other polarity of said error signal when said selected temperature is greater than the actual temperature of said hot plate for producing output power in an amount controlled by the magnitude of said error signal;

and means for indicating the power delivered from said amplifier to said resistive heater;

said amplifier being adapted to produce its maximum output power in response to an error signal of said other polarity whose magnitude is very small compared to said predetermined range of values of said selected temperature, whereby when said selected temperature is set above the actual temperature of said hot plate by an amount which is large compared to said predetermined temperature range said amplifier initially delivers its maximum output power to said heater for rapidly raising the temperature of said hot plate, and thereafter when the temperature of said hot plate becomes substantially equal to said selected temperature the amount of output power delivered by said amplifier is reduced so as to substantially equal the amount of heat energy being drawn from said hot plate at said selected temperature.

4. Apparatus as claimed in claim 3 wherein said amplifier includes a series of transistor amplifier stages.

5. Apparatus as claimed in claim 3 wherein said electrical circuit means includes a bridge circuit having four resistance legs, said selection means being a variable resistor constituting one of said legs, and said temperature sensitive device being a thermistor constituting another of said legs.

6. Apparatus as claimed in claim 3 which includes a movable probe within which said hot plate, said resistive heater and said temperature sensitive device are disposed, said face of said hot plate constituting an outer face of said probe whereby said probe may be selectively placed in engagement with a body whose heat dissipating capacity is to be measured.

7. Heat transfer measuring apparatus for measuring the rate of heat flow into a heat sink at a selected predetermined temperature comprising, a heat conductive hot plate having a face for dissipating heat, an electrical resistive heater positioned adjacent said hot plate and adapted to convert electrical power into heat which is conducted into said hot plate and dissipated at said face thereof, an electrical power amplifier having its output coupled to said heater for supplying power thereto, a thermistor positioned adjacent said hot plate face for sensing the approximate temperature thereat, an electrical bridge circuit including a first branch having first and second serially connected resistances and a second branch connected in parallel to first branch and including third and fourth serially connected resistances, means providing a fixed voltage across said parallel branches, said thermistor having its leads connected in parallel with said first resistance, said second resistance being selectively adjustable over a range of resistive values, a differential voltage amplifier having two inputs and an output creating a signal proportional to the difference in voltages applied at said inputs, means connecting one of said inputs to the adjacent ends of said first and second resistors, means connecting the other said input to the adjacent ends of said third and fourth resistors, means connecting said differential amplifier output to the input of said power amplifier, said amplifiers and bridge circuit having their parameters selected so that sufficient heat is supplied to said hot plate to maintain it at a substantially constant temperature selectively predetermined by the value of said second resistance over a range of values of heat dissipation by said hot plate, and means for measuring the heat power dissipated by said hot plate.

8. Apparatus as described in claim 7 further defined by an electrically insulative heat conducting layer being provided on said hot plate, said resistive heater being formed as an electrically conductive coil wound on said layer whereby heat is conducted through said layer into said hot plate, heat insulating means disposed over substantially all the exposed surfaces of said hot plate except for said face thereof, said hot plate having a bore extending therein to a position closely adjacent said face, and said thermistor being disposed in said bore.

9. Apparatus as described in claim 7 wherein said first resistance has a fixed resistance value equal to 0.3 times the resistance of said thermistor at 25° C.

10. Apparatus as described in claim 7 further defined by said measuring means including a meter indicating electrical power coupled to said power amplifier output, switching means for selectively varying the range of power to be indicated by said meter, and zero adjusting means for selectively setting the meter to read zero when a predetermined amount of power is being produced at said power amplifier output.

References Cited by the Examiner

UNITED STATES PATENTS

| | | | |
|---|---|---|---|
| 2,475,138 | 7/1949 | Hood et al. | 73—15 |
| 2,488,580 | 11/1949 | Burleigh | 73—362 X |
| 2,547,750 | 4/1951 | Hall | 73—362 X |
| 2,593,562 | 4/1952 | Hornfeck | 13—24 X |
| 2,735,923 | 2/1956 | Juvinall et al. | 219—241 X |
| 2,878,669 | 3/1959 | Knudson et al. | 73—15 |
| 2,882,328 | 4/1959 | Worden | 13—24 |
| 2,951,360 | 9/1960 | Samson et al. | 73—15 |
| 3,075,377 | 1/1963 | Lang | 73—15 |
| 3,093,791 | 6/1963 | Richards | 73—15 X |
| 3,114,255 | 12/1963 | Niven | 73—15 |

OTHER REFERENCES

Hager, N. E., Jr.: Thin-Heater Thermal Conductivity Apparatus, in The Review of Scientific Instruments 31(2): p. 177, February 1960. Copy in 73/15.

RICHARD C. QUEISSER, Primary Examiner.

DAVID SCHONBERG, Examiner.

JERRY W. MYRACLE, Assistant Examiner.